US007734486B2

(12) United States Patent
Mortimore, Jr.

(10) Patent No.: US 7,734,486 B2
(45) Date of Patent: *Jun. 8, 2010

(54) METHODS AND SYSTEM FOR PREFERRED VENDOR PRE-TRANSACTION BIDDING

(75) Inventor: William Charles Mortimore, Jr., San Francisco, CA (US)

(73) Assignee: Rearden Commerce, Inc., Foster City, CA (US)

( * ) Notice: Subject to any disclaimer, the term of this patent is extended or adjusted under 35 U.S.C. 154(b) by 242 days.

This patent is subject to a terminal disclaimer.

(21) Appl. No.: 11/549,965

(22) Filed: Oct. 16, 2006

(65) Prior Publication Data

US 2008/0091479 A1   Apr. 17, 2008

(51) Int. Cl.
G06Q 10/00 (2006.01)
G06Q 40/00 (2006.01)
(52) U.S. Cl. ............................................. 705/5; 705/37
(58) Field of Classification Search .................. 705/5, 705/37
See application file for complete search history.

(56) References Cited

U.S. PATENT DOCUMENTS

| 5,404,291 | A | * | 4/1995 | Kerr et al. ........................ 705/5 |
| 5,948,040 | A | | 9/1999 | DeLorme et al. |
| 6,018,715 | A | * | 1/2000 | Lynch et al. ..................... 705/5 |
| 6,134,534 | A | * | 10/2000 | Walker et al. .................. 705/26 |
| 6,304,850 | B1 | * | 10/2001 | Keller et al. ..................... 705/5 |
| 7,050,986 | B1 | * | 5/2006 | Vance et al. ..................... 705/5 |
| 7,236,942 | B1 | * | 6/2007 | Walker et al. .................. 705/14 |
| 7,401,025 | B1 | | 7/2008 | Lokitz |
| 2002/0010664 | A1 | * | 1/2002 | Rabideau et al. .............. 705/30 |
| 2002/0082978 | A1 | * | 6/2002 | Ghouri et al. .................. 705/37 |
| 2002/0087384 | A1 | * | 7/2002 | Neifeld ......................... 705/10 |
| 2003/0053611 | A1 | | 3/2003 | Lee |
| 2003/0061145 | A1 | * | 3/2003 | Norrid .......................... 705/37 |
| 2003/0187710 | A1 | | 10/2003 | Baumer et al. |
| 2005/0138187 | A1 | | 6/2005 | Breiter et al. |
| 2005/0143064 | A1 | | 6/2005 | Pines et al. |
| 2005/0254440 | A1 | | 11/2005 | Sorrell |
| 2006/0149655 | A1 | * | 7/2006 | Leahy et al. ................... 705/37 |
| 2006/0235754 | A1 | * | 10/2006 | Walker et al. .................. 705/15 |

OTHER PUBLICATIONS

"Trip.com Takes Off as Cendant-Affiliant Re-launches Full-Service Leisure Travel Web Sit With $40-Plus Million Ad Campaign", PR Newswire, Apr. 29, 2002.*
Smith, Calvin et al., "The Talaris Services Business Language: A Case Study on Developing XML Vocabulaires Using the Universal Business Language," School of Information Management & Systems, University of California, Sep. 2002, pp. 1-16.

* cited by examiner

Primary Examiner—John W Hayes
Assistant Examiner—Kevin Flynn
(74) Attorney, Agent, or Firm—Greenberg Traurig, LLP

(57) ABSTRACT

In one embodiment, a method that can be performed on a system, is provided for preferred vender pre-transaction bidding. In one embodiment, the method comprises providing to a user one or more offers for sale of an item or service, the offers matching criteria pre-determined by one of a separate user or entity; receiving a selection of at least one offer from the user; comparing the selected offer to a set of pre-determined preferences of the user and generating and transmitting a request to one or more vendors for a counter-offer based on the set of pre-determined preferences of the user; in response to receiving one or more counter-offers, comparing the one or more counter offers to the criteria pre-determined by the separate user or entity; and providing to the user one or more of the counter-offers matching the criteria pre-determined by the separate user or entity.

6 Claims, 2 Drawing Sheets

METHODS AND SYSTEM FOR PREFERRED VENDOR PRE-TRANSACTION BIDDING

BACKGROUND OF THE INVENTION

Often a buyer of goods and services may be forced to choose a provider based on selection criteria other than his own. For example, an employee on a business trip may be constrained by company policy to travel on an airline other than the airline of his own preference. For example, for certain types of flights, the employee is required to fly by the very lowest cost carrier, although using that particular may be inconvenient or distasteful to the employee.

What is clearly needed is a system and method for eliciting a counter-offer from a vendor preferred by the buyer that meets the criteria for cost, quality, etc., of the goods or services provided by the vendor selected by an external party, or at least approaches such criteria within a reasonable range. For example, if a traveler books a reservation through his company on the company's selected airline, then before the tickets are paid for, said novel system and method could elicit a counter-offer from the traveler's preferred airline that meets or comes within, for example, $25 of the cost of the tickets booked with the company's chosen airline. What is further needed is a system and method for such a counter-offer to be accepted either automatically, according to certain preprogrammed rules, or manually after review by the buyer. Also, in some cases other attributes of the service, such as price, seat location, etc. may drive a change of airline. Furthermore, a third party, or some top down influence is relevant, but not necessary.

SUMMARY

In one embodiment, a method that can be performed on a system, is provided for preferred vender pre-transaction bidding. In one embodiment, the method comprises providing to a user one or more offers for sale of an item or service, the offers matching criteria pre-determined by one of a separate user or entity; receiving a selection of at least one offer from the user; comparing the selected offer to a set of pre-determined preferences of the user and generating and transmitting a request to one or more vendors for a counter-offer based on the set of pre-determined preferences of the user; in response to receiving one or more counter-offers, comparing the one or more counter offers to the criteria pre-determined by the separate user or entity; and providing to the user one or more of the counter-offers matching the criteria pre-determined by the separate user or entity.

DETAILED DESCRIPTION OF THE INVENTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

Figure 1:
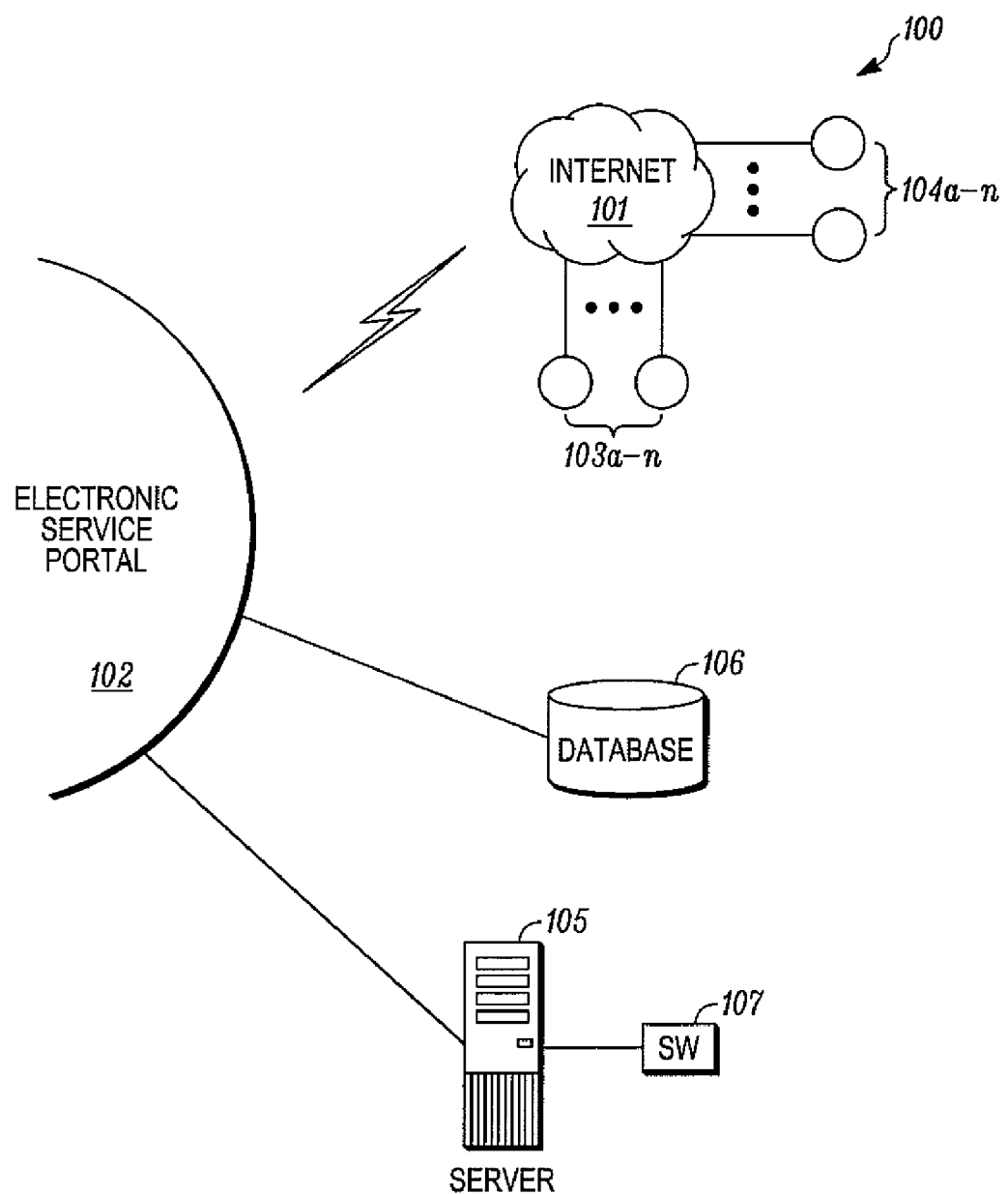
FIG. 1 illustrates an exemplary system, in accordance with one embodiment.

FIG. 1 shows an exemplary system 100 according to the present invention, containing an electronic services portal 102 and Internet 101. Services portal 102 has at least one server 105 with a software instance 107, containing both software for the novel implementation and possibly other software, and also a storage unit 106. Portal 102 is typically connected to Internet 101, as are customers 103a-n and vendors and suppliers 104a-n. In this exemplary system, the services portal 102 may have, for example, a relationship with the preferred airline of a customer 103x (not shown). When customer 103x attempts to book a flight with his preferred airline, the price may be $100 more than his budget limit, so he books with another airline. As part of the booking process, portal 102 would extract data about the travel preferences of customer 103x from storage unit 106 and would automatically send a message to the preferred airline of customer 103x, saying that the customer is willing to pay n amount for a similar flight on a competitor, and asking whether the customer's preferred airline would like to meet that price or make a counter offer.

Figure 2:
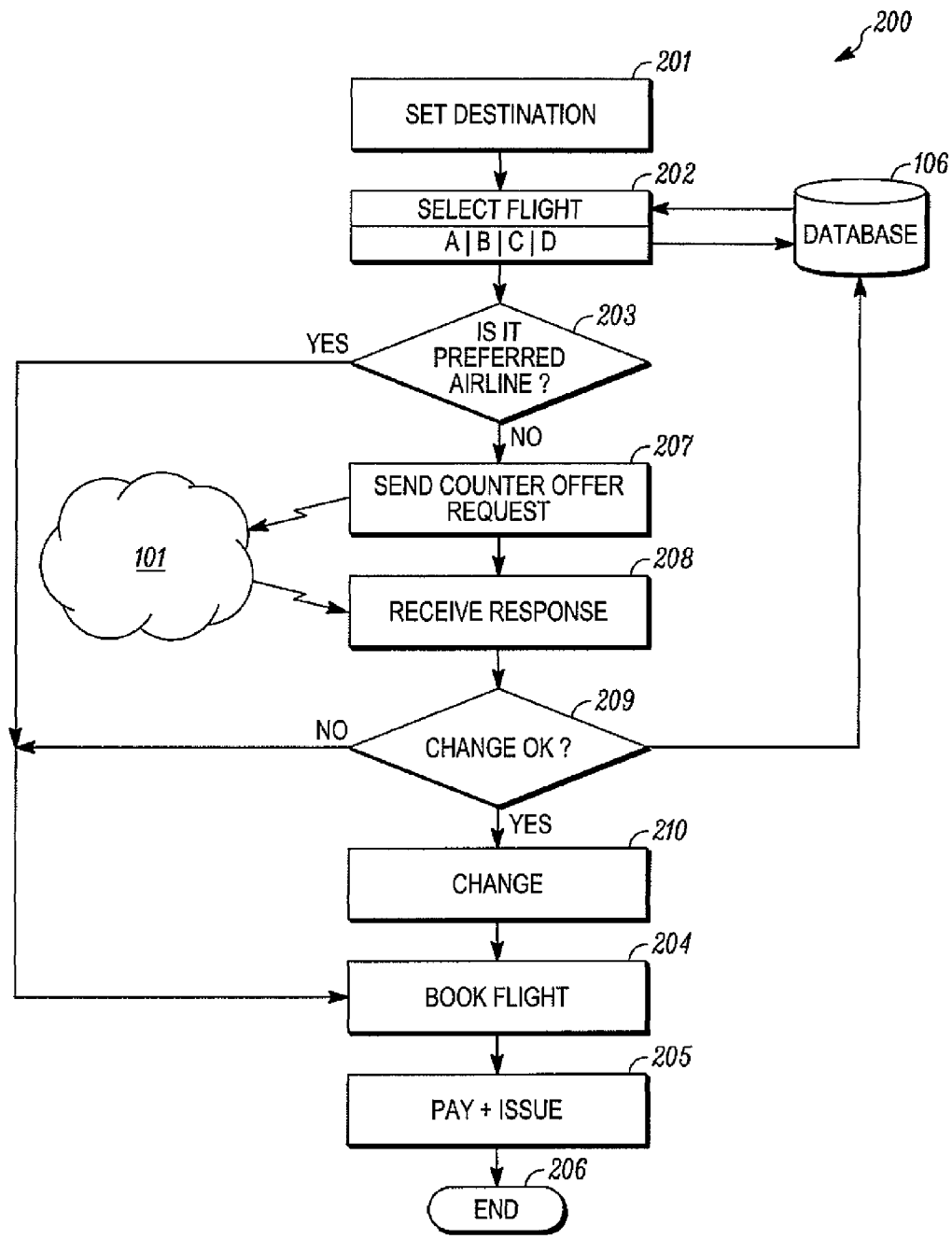
FIG. 2 shows an exemplary process of the method for implementation of the system according to the present invention.

FIG. 2 shows an exemplary process 200 of the method for implementation of the system according to the present invention. In step 201, the user enters his destination. In step 202, the system presents a selection of flights. As mentioned earlier, these flights may not be the preferred choice of the user, but rather, may be those flights approved by the user's company on criteria of price, etc. At this step, the system interacts with data from storage unit 106, and this step may require multiple interactions. In step 203, the process branches. If the buyer is able to select a flight on his preferred airline (yes), the process moves to step 204, where a ticket is booked, and then to step 205, where the payment means are established and the ticket is issued. Then in step 206, the process ends. It is clear that in some cases a traveler may have more than one preferred airline. For example, a traveler may have frequent flyer miles on two different carriers, but the two may have different routes and schedule, such as, for example, one carrier that offers local flights and one carrier that offers trans-continental and international flights. Also, in some cases, the booking of the flight in step 204 may precede the query whether the flight is with the preferred airline, so the order of steps 204 and 203 may be reversed.

If, in step 203, the buyer is not able to select a flight on his preferred airline (no), the process moves to step 207, where the system sends a counter-offer request to the buyer's preferred airline, typically via Internet 101. In step 208, the system receives a response, also typically via the Internet. Such a counter-offer may be that the airline is willing to match the price of the airline that would be chosen by default, or at least the airline can make a counter-offer that adds only a small amount to the price. Based on preprogrammed rules, such as company policies, in step 209 the process branches again as the system determines whether or not it can change the airline selection. If the system cannot change the airline (no), the process moves to step 204 and the original booking proceeds. If, however, the system can accept the change (yes), then in step 210 it changes the airline selection and the process moves to step 204, where the booking proceeds on the new airline. If steps 203 and 204 were previously reversed, so that a first flight was already booked, the booking must also be changed, and then the process moves to step 205, to finalize the ticket purchase.

It is clear that many modifications and variations of this embodiment may be made by one skilled in the art without departing from the spirit of the novel art of this disclosure. This method and system may apply to any of a great variety of goods and services, such as restaurant reservations, hotel rooms, etc. It may also apply not only to a preferred vendor vs. a different vendor, but to various classes of service and quality offered by the same vendor, such as an upgrade from coach to business class for a flight, or a better hotel room with more square footage, a better view, additional amenities, etc.

The processes described above can be stored in a memory of a computer system as a set of instructions to be executed. In addition, the instructions to perform the processes described above could alternatively be stored on other forms of machine-readable media, including magnetic and optical disks. For example, the processes described could be stored on machine-readable media, such as magnetic disks or optical disks, which are accessible via a disk drive (or computer-readable medium drive). Further, the instructions can be downloaded into a computing device over a data network in a form of compiled and linked version.

Alternatively, the logic to perform the processes as discussed above could be implemented in additional computer and/or machine readable media, such as discrete hardware components as large-scale integrated circuits (LSI's) and application-specific integrated circuits (ASIC's), and firmware such as electrically erasable programmable read-only memory (EEPROM's).

What is claimed is:

1. A computer-implemented method comprising:
   in response to a request from a user for an airline-flight from a first location to a second location, providing to the user, via a network connection, one or more offers for sale of the airline-flight from the first location to the second location, the one or more offers matching a price-criteria pre-determined by an employer of the user, and the one or more offers excluding offers from a preferred vendor of the user;
   receiving, via the network connection, a selection of at least one offer from the user;
   identifying, via a computing device, at least one preferred vendor of the user;
   automatically generating and transmitting, via a computing device, a message to the at least one preferred vendor of the user, the message identifying a price of the user-selected offer, and the message requesting from the at least one preferred vendor a counter-offer for sale of an airline-flight from the first location to the second location, based on the price of the user-selected offer;
   in response to receiving at least one counter-offer for sale of the airline-flight from the first location to the second location, comparing the at least one counter-offer to the price-criteria pre-determined by the employer of the user; and
   providing, via the network connection, to the user the at least one counter-offer for sale of the airline-flight from the first location to the second location matching the price-criteria pre-determined by the employer of the user, wherein the at least one counter-offer is within a predetermined range of the price of the user-selected offer.

2. A machine-readable medium having stored thereon a set of instructions, which when executed perform a method comprising:
   in response to a request from a user for an airline-flight from a first location to a second location, providing to the user, via a network connection, one or more offers for sale of the airline-flight from the first location to the second location, the one or more offers matching a price-criteria pre-determined by an employer of the user, and the one or more offers excluding offers from a preferred vendor of the user;
   receiving, via the network connection, a selection of at least one offer from the user;
   identifying, via a computing device, at least one preferred vendor of the user;
   automatically generating and transmitting, via a computing device, a message to the at least one preferred vendor of the user, the message identifying a price of the user-selected offer, and the message requesting from the at least one preferred vendor a counter-offer for sale of an airline-flight from the first location to the second location, based on the price of the user-selected offer;
   in response to receiving at least one counter-offer for sale of the airline-flight from the first location to the second location, comparing the at least one counter-offer to the price-criteria pre-determined by the employer of the user; and
   providing, via the network connection, to the user the at least one counter-offer for sale of the airline-flight from the first location to the second location matching the price-criteria pre-determined by the employer of the user, wherein the at least one counter-offer is within a predetermined range of the price of the user-selected offer.

3. The machine-readable medium of claim 2, wherein the travel-related item or service comprises a travel reservation.

4. The machine-readable medium of claim 2, wherein the travel-related item or service comprises one of an airline flight, a hotel reservation, and a restaurant reservation.

5. The machine-readable medium of claim 4, wherein the criteria pre-determined by the employer of the user includes at least one of a class of travel, cost, destination, and carrier of travel.

6. The machine-readable medium of claim 2, wherein the counter-offer is matching one or more of the offers for sale of a travel-related item or service.

\* \* \* \* \*

UNITED STATES PATENT AND TRADEMARK OFFICE
CERTIFICATE OF CORRECTION

| | |
|---|---|
| PATENT NO. | : 7,734,486 B2 |
| APPLICATION NO. | : 11/549965 |
| DATED | : June 8, 2010 |
| INVENTOR(S) | : William Charles Mortimore, Jr. |

Page 1 of 1

It is certified that error appears in the above-identified patent and that said Letters Patent is hereby corrected as shown below:

In Column 4,
Line 43, replace "The machine-readable medium of claim 2" with --The machine-readable medium of claim 6--

In Column 4,
Line 45, replace "The machine-readable medium of claim 2" with --The machine-readable medium of claim 6--

Signed and Sealed this

Twenty-seventh Day of July, 2010

David J. Kappos
*Director of the United States Patent and Trademark Office*